Dec. 20, 1966  G. S. McGUIRE  3,292,476
WADDING CUTTER
Filed March 29, 1965

INVENTOR
GENE S. McGUIRE
BY
Rudolph L. Lowell
ATTORNEY 3,292,476
WADDING CUTTER
Gene S. McGuire, 6530 Del Matro,
Des Moines, Iowa 50311
Filed Mar. 29, 1965, Ser. No. 443,443
3 Claims. (Cl. 83—456)

This invention relates to a cutter device for cutting sheets of soft paper wadding or packing material of varying thickness into selected lengths.

An object of this invention is to provide an improved device for cutting paper wadding.

Another object of this invention is to provide a cutter device having a flexible cutting member adapted to cut along a predetermined straight line.

A further object of this invention is to provide a wadding cutter device having a handle secured to the flexible cutting member with the handle horizontally actuated to cut the wadding material.

A still further object of this invention is to provide a cutter device having a support base and a clamp member for clamping the material to be cut against the support base wherein a cutting means is operably associated with the base and clamp member so as to maintain the clamping position of the clamp member during a cutting operation.

One other object of this invention is to provide a wadding cutter that is simple to operate, inexpensive to manufacture, readily portable, and efficient in operation.

Other objects and advantages of the invention will become apparent from the following detailed description taken in connection with the accompanying drawings, in which.

Figure 1:
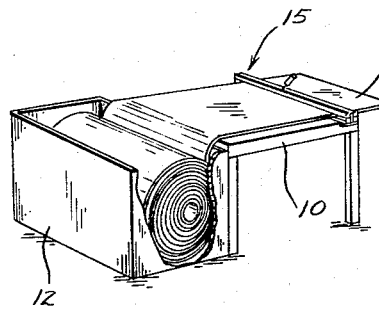
FIG. 1 is a perspective view of a roll of wadding paper in a carton having a side broken away in part and a cutting table shown in an operating relation with the cutting device of this invention.

As shown in FIG. 1, the cutting device of this invention may be placed on the top and near one side of a conventional cutting table 10 with a packaging material carton 12 supported on the floor adjacent the opposite side of the table. The upper lid of the carton has been removed so that the packing material 13 therein can be moved across the top surface of the table 10 and through the cutting device 15 for separation into desired lengths.

Figures 5, 6:
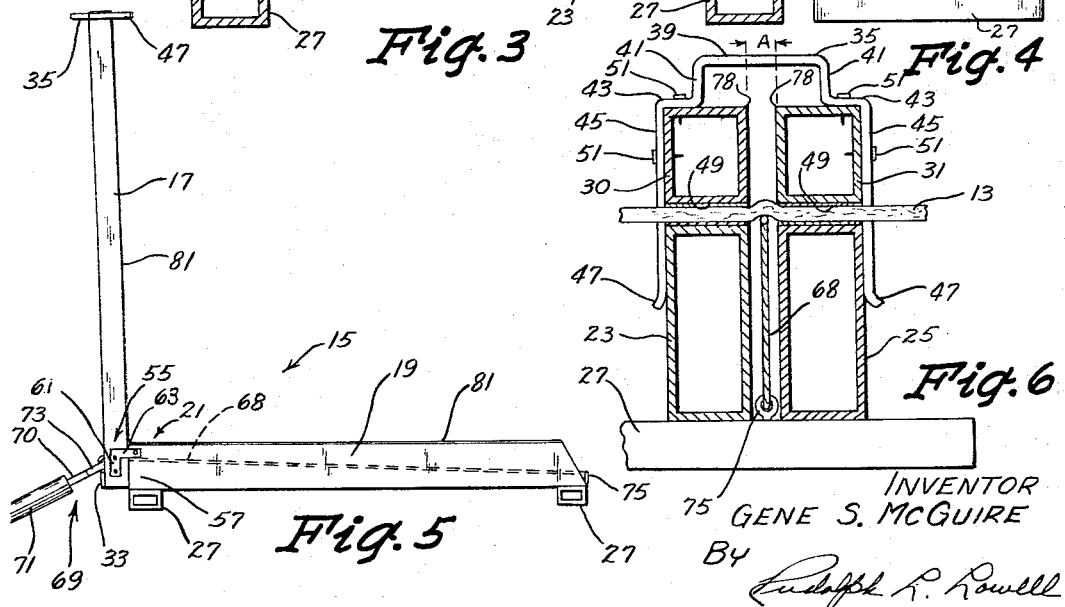
FIG. 5 is a reduced side view of the invention with the clamp member shown in a raised position.
FIG. 6 is an enlarged sectional view taken along the line 6—6 in FIG. 3.

The cutter device 15, as shown in FIG. 5, consists of a clamp means or unit 17 pivotally secured to one end of a support base or guide unit 19 and a flexible cutting means 21 secured to the support base and clamp unit.

The support base 19 is comprised of a pair of elongated metal tubular base members 23 and 25 of a rectangular shape in transverse cross section. These members 23 and 25 are in a spaced parallel relation with their opposite ends secured as by welding to connecting tubular foot members 27, which are also of a rectangular shape in cross section. As best appears in FIGS. 3 and 6, the foot members 27 have their wide sides extended horizontally, and the base members 23 and 25 have their narrow sides horizontally extended so that a space A is formed between adjacent wide sides of the base members. The length of the foot members 27 need only be such as to adequately distribute a load vertically applied to the base members 23 and 25 so as to prevent lateral tipping of the cutting device.

The clamp unit or means 17 comprises a pair of elongated and parallel tubular guide rails 30 and 31 which are secured together at one of their ends by a connecting means 33 and at their other ends by a handle means 35. The guide rails 30 and 31 are of a square tubular shape in transverse cross section, with a side thereof equal in width to the narrow sides of the base members 23 and 25. It will also be seen (FIG. 6) that the space between the guide rails 30 and 31 is equal in width to the space A between the base members. The connecting means 33 comprises a rectangular plate which is secured to the guide rails 30 and 31 by screws 37.

As best shown in FIG. 6, the handle means 35 is constructed from an elongated metal strap member bent into an irregular shape having a grip section 39 of inverted U-shape formed with legs 41 having outwardly projected lateral extensions 43, which in turn terminate in guide legs 45 that are arranged substantially parallel to the legs 41. The ends 47 of the guide legs are curved laterally outward for a purpose to appear later.

The guide rails 30 and 31 are received between the guide legs 45 with a portion of the top surfaces thereof against the lateral extensions so that a corresponding extension 43 and guide leg 45 are in a nesting relation with the corresponding adjacent surfaces of the guide rails. It is also seen that the guide legs 45 project beyond the surfaces 49 of the guide rails. The handle means 35 is secured to the guide rails 30 and 31 by screws 51 and cooperates with the connecting means 33 to hold the guide rails together in a spaced parallel relation.

Figure 3:
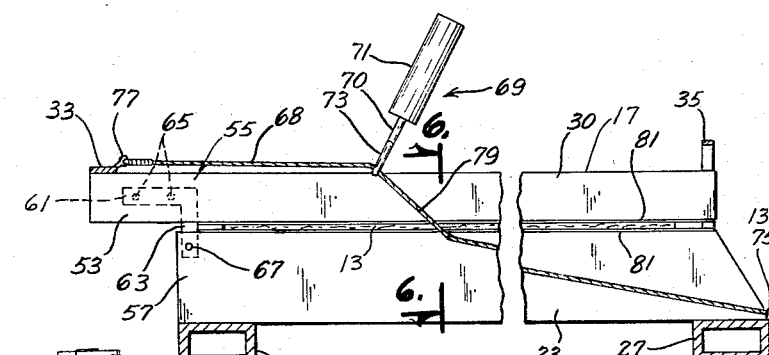
FIG. 3 is an enlarged aforeshortened sectional view taken along line 3—3 in FIG. 2.
Figure 4:
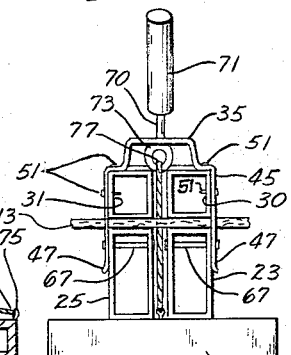
FIG. 4 is an enlarged end view taken along line 4—4 in FIG. 2.

The end section 53 of the clamp means 17 remote from the handle means 35 is secured by a hinge means 55 to the end section 57 of the support base 19, so that the clamp means is pivotally movable relative to the support base to a first position overlying and parallel to the support base and to a second position extended upwardly from the support base and outwardly from its end section 57. The hinge means 55 comprises a pair of L-shaped connecting plates 59 having legs 61 and 63. As shown in FIG. 3, the legs 61 extend horizontally against the outer vertical sides of the end section 53 of the clamp means 17 and are secured thereto by screws 65. Horizontally extended pin members 67 in the end section 57 of the support base 19 are secured to the legs 63 so that the clamp means is rotatable about the pin members.

The cutting means 21 comprises a flexible cable 68 and an actuator or handle 69 having an axially extended shaft 70 with one end secured to a grip member 71 and the other end reversibly bent into a circular loop 73. One end of the cable 68 is anchored to an eyelet 75 secured to the foot member 27 adjacent the handle means 35 and between the base members 23 and 25. The cable 68 from the eyelet 75 extends between the guide rails 30 and 31, and through the loop 73 of the handle 69 for the anchoring of its opposite end to an eyelet 77 that is secured to the connecting means 33.

Figure 2:
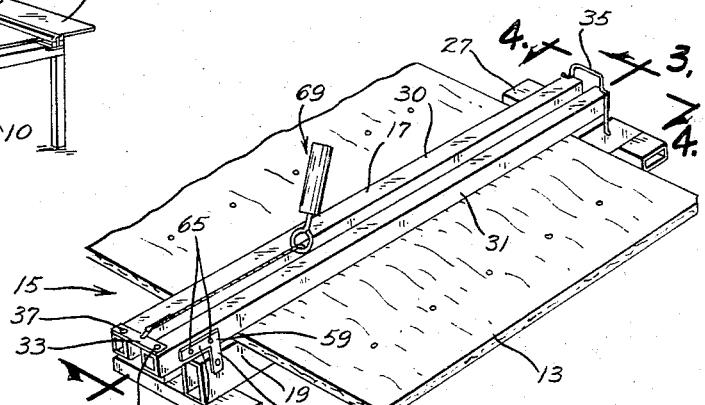
FIG. 2 is an enlarged perspective view of the cutting device in FIG. 1 showing the parts thereof in cutting relation with the sheet material being cut.

In the operation of the invention, the clamp means 17 is rotated about the pin members 67 to its position shown in FIG. 5. The packaging material 13 is then placed across the base members 23 and 25 between the ends thereof, and the clamp means 17 is rotated to its horizontal position shown in FIG. 2, wherein the guide legs 45 of the handle means 35 straddle the base members 23 and 25. In this position, the guide rails 30 and 31 are located in a superposed relation with the base members 19 by the guiding action of the legs 45 whereby the space A between the base members and the guide rails, respectively, are vertically aligned to form a continuous passage or opening therethrough. The packing material 13 is held between the support base 19 and the clamp means 17 whereupon the handle 69 is pulled horizontally across the guide rails 30 and 31 to pull the cable 68 upward through the packaging material 13. As shown in FIG. 3, the cable is vertically displaced from a first position below the packaging material to a second horizontal position above the guide rails on cutting movement of the handle 69.

The circular loop 73 of the handle 69, having a greater diameter than the space A between the guide rails 30 and 31, provides a reaction contact against the upper surface of the guide rails which is counter to the resistance of the packaging material to the cutting action of the cable 68. This reaction contact or downward pressure eliminates the necessity of additional operator hand pressure to hold the clamp means 17 in a horizontal position. During the horizontal cutting movement, the outer surface of the loop 73 will contact the inside edges 78 (FIG. 6) of the upper surfaces of the guide rails 30 and 31 thereby guiding the handle 69 in a controlled path parallel to the guide rails.

The length of the cable 68 is controlled in order to maintain an obtuse angle, preferably between 125–145 degrees, between the packaging material 13 to be cut and a cutting edge 79 of the cable (FIG. 3). Furthermore, the length of the cable is such that when the clamp means 17 is in the raised position shown in FIG. 5, the cable is received within the space A with the handle 69 substantially adjacent the end section 57 of the support base 19. It is seen, therefore, that the cable 68 remains below the upper surfaces of the base members 23 and 25 when the clamp means 17 is in a raised position whereby the packaging material 13 to be cut is loaded on the support base 19 without interference with the cable 68.

Because of the preselected length of the cable, the cutting edge 79 of the cable 68 precedes the horizontal cutting movement of the handle 69 thereby assuring separation of the packaging material throughout its width (FIG. 3). After complete separation, the handle 69 and the clamp means 17 are returned to their original positions as shown in FIG. 5 thereby placing the cutter assembly 15 in position for another cutting cycle.

As shown in FIGS. 5 and 6, the adjacent surfaces of the base members 23 and 25 and the guide rails 30 and 31 may be covered with elongated non-skid strips 81 bonded thereto. These strips provide a resistance to the movement of the packaging material when held between the support base 19 and clamp means 17 to aid in cutting along a predetermined straight line.

The space between the support and guide rails must be greater than the cable diameter but may be regulated depending upon the thickness and strength of the packaging material to assure a straight and undistorted cut edge.

It is obvious that the cutter assembly could be constructed in various lengths and sizes having other types of flexible cutting means in order to separate a variety of materials in the same manner disclosed herein.

While there have been shown, described and pointed out the fundamental novel features of the invention as applied to the preferred embodiment it is to be understood that various omissions, substitutions, changes in form, and details of the invention illustrated may be made by those skilled in the art without departing from the spirit of the invention. It is intended to be limited only as indicated by the scope of the following claims.

I claim:
1. A cutter device for use in cutting a sheet of wadding material comprising:
 (a) a base member having a longitudinally extended opening,
 (b) a guide unit having a longitudinally extended opening,
 (c) means for connecting one end of said guide unit to one end of said base member for movement from a first superposed position in parallel and adjacent relation to said base member to a second position extended upwardly from said one end of the base member,
 (d) a cutting means including an elongated flexible member and an actuator operably connected therewith for longitudinal movement relative to said flexible member,
 (e) one end of said flexible member secured to the top surface of said guide unit at the one end of said guide unit, and the other end of said flexible member secured adjacent the bottom surface of said base member at the end thereof remote from said one end of the base member so that the portion of said flexible member between the connected ends thereof is extendible in said openings when the guide unit is in said first position therefor, and
 (f) said actuator movable horizontally and against the top surface of said guide unit when the guide unit is in said first position therefor to progressively displace said portion of the flexible member upwardly from a position within the opening of said base member to a position above said guide unit whereby to cut sheet material disposed between said base member and the guide unit when the guide unit is in said first position.
2. A cutter device as claimed in claim 1 in which:
 (a) said flexible member is of a length to provide for the progressive upward movement of said portion of the flexible member in a leading relation relative to the longitudinal movement of said handle.
3. A cutter device as claimed in claim 1 including:
 (a) a handle means secured to the other end of said guide unit having parallel guide legs, and
 (b) said guide legs coacting with said base support, when said guide unit is in said second position, to maintain said openings in vertical alignment.

References Cited by the Examiner

UNITED STATES PATENTS 2,609,047  9/1952  Wilkoff _____ 83—926.2

FOREIGN PATENTS 147,289  7/1952  Australia.

WILLIAM S. LAWSON, *Primary Examiner.*

L. B. TAYLOR, *Assistant Examiner.*